United States Patent
Liao et al.

(10) Patent No.: US 6,481,474 B1
(45) Date of Patent: Nov. 19, 2002

(54) WOOD PLANING MACHINE WITH A WOOD SHAVING COLLECTING MECHANISM

(76) Inventors: Juei-Seng Liao, No. 295, Sec. 1, Nanking E. Rd., Taichung City (TW); Pei-Lieh Chiang, No. 12, Nan-Ping Rd. Nan Dist., Taichung City (TW)

( * ) Notice: Subject to any disclaimer, the term of this patent is extended or adjusted under 35 U.S.C. 154(b) by 0 days.

(21) Appl. No.: 10/096,553

(22) Filed: Mar. 13, 2002

(30) Foreign Application Priority Data

Dec. 27, 2001 (TW) .......................... 090223206

(51) Int. Cl.⁷ .................... B27G 19/00; B27C 1/00
(52) U.S. Cl. .................. 144/252.1; 144/114.1; 144/117.1; 409/137; 451/453
(58) Field of Search ............... 451/453, 456; 144/114.1, 117.1, 252.1; 83/100; 409/137

(56) References Cited

U.S. PATENT DOCUMENTS

| | | | |
|---|---|---|---|
| 4,009,741 A | 3/1977 | Zimmerman | 144/41 |
| 6,148,879 A | 11/2000 | Liao | 144/117.1 |
| 6,289,956 B1 | 9/2001 | Shriver | 144/252.1 |
| 6,293,321 B1 | 9/2001 | Chiang | 144/252.1 |
| 6,382,278 B1 * | 5/2002 | Liao et al. | 144/252.1 |

* cited by examiner

*Primary Examiner*—W. Donald Bray
(74) *Attorney, Agent, or Firm*—Ladas & Parry

(57) ABSTRACT

A wood planing machine includes a rotatable cutting member mounted on an upper end of a machine frame and driven by a first output shaft of a motor which is mounted on a lower end of the machine frame. A shaving collecting member confines a duct with an intake port disposed in the vicinity of the cutting member and an outlet port disposed adjacent to the lower end of the frame. A drive transmission member transmits the driving force of a second output shaft of the motor to a drive shaft of a blowing mechanism to rotate an impeller for drawing wood shavings from the shaving collecting member into the blowing mechanism and out of a discharge port.

4 Claims, 5 Drawing Sheets

US 6,481,474 B1

WOOD PLANING MACHINE WITH A WOOD SHAVING COLLECTING MECHANISM

CROSS-REFERENCE TO RELATED APPLICATION

This application claims priority of Taiwan patent Application No. 090223206, filed on Dec. 27,2001.

BACKGROUND OF THE INVENTION

1. Field of the Invention

This invention relates to a wood planing machine, more particularly to a wood planing machine with a wood shaving collecting mechanism which is driven by a motor thereof.

2. Description of the Related Art

U.S. patent application Ser. No. 09/929,444 by the Applicants discloses a wood planing machine that includes a mounting frame, a motor which is disposed adjacent to a lower end of the frame, a cutting member which is rotatably mounted on an upper end of the frame and which is driven by the motor via a first drive transmission member, and a shaving collecting member which is disposed above the upper end of the frame to collect wood shavings. The collecting member is formed as a hood which confines a duct disposed in the vicinity of the cutting member. A blowing member is connected to the collecting member, and includes a drive shaft which is driven by the rotating force of the cutting member via the second drive transmission member so as to rotate an impeller mounted thereon, thereby drawing wood shavings from the collecting member into the blowing member and out of a discharge port of the blowing member.

Since the blowing member and the second transmission member are mounted outside the mounting frame, and since the drive shaft is driven by the rotating force of the cutting member, the whole machine is bulky and is liable to make much noise during operation.

SUMMARY OF THE INVENTION

The object of the present invention is to provide a wood planing machine which can overcome the aforesaid problem.

According to this invention, the wood planing machine includes a machine frame with right and left mounting sides spaced apart from each other in a longitudinal direction. Each of the right and left mounting sides has upper and lower ends opposite to each other in an upright direction transverse to the longitudinal direction. A motor is disposed on the machine frame adjacent to the lower ends of the right and left mounting sides, and has first and second output shafts defining first and second axes and extending in the longitudinal direction to deliver driving forces. The first and second output shafts are disposed opposite to each other in the longitudinal direction. A cutting member has a rotating shaft which is rotatably mounted on the right and left mounting sides and adjacent to the upper ends of the right and left mounting sides, and which extends in the longitudinal direction to define a third axis parallel to the first axis, and a cutting blade which is mounted on and which is rotated with the rotating shaft about the third axis. A first transmission member is disposed to transmit the driving force of the first output shaft to the rotating shaft. A support carriage is disposed on the right and left mounting sides and is movable relative to the rotating shaft in the upright direction so as to cooperate with the rotating shaft to confine a path therebetween for passage of a workpiece. A shaving collecting member is disposed on the machine frame to collect wood shavings, and confines a duct which has an intake port that is disposed in the vicinity of the cutting member, and an outlet port which is disposed downstream of the intake port and adjacent to the lower ends of the right and left mounting sides. A casing is disposed under the support carriage, and has proximate and distal walls which are spaced apart from each other in the longitudinal direction and which are respectively proximate and distal to the outlet port to confine an accommodation chamber. The casing further has a discharge port which is disposed between the proximate and distal walls and which extends in a direction radial to the longitudinal direction. The proximate wall has an inlet port which is formed therethrough in the longitudinal direction and which is communicated with the outlet port so as to communicate the duct with the accommodation chamber. A drive shaft is rotatably mounted on the distal wall, extends along a fourth axis parallel to the second axis, and has a first end which extends into the accommodation chamber, and a second end which extends from the first end and outwardly of the distal wall. A second drive transmission member is disposed to transmit the driving force of the second output shaft to the second end of the drive shaft so as to rotate the drive shaft about the fourth axis when the motor is operated. An impeller is received in the accommodation chamber, and is driven by the first end of the drive shaft to rotate about the fourth axis so as to draw wood shavings from the shaving collecting member into the accommodation chamber and out of the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
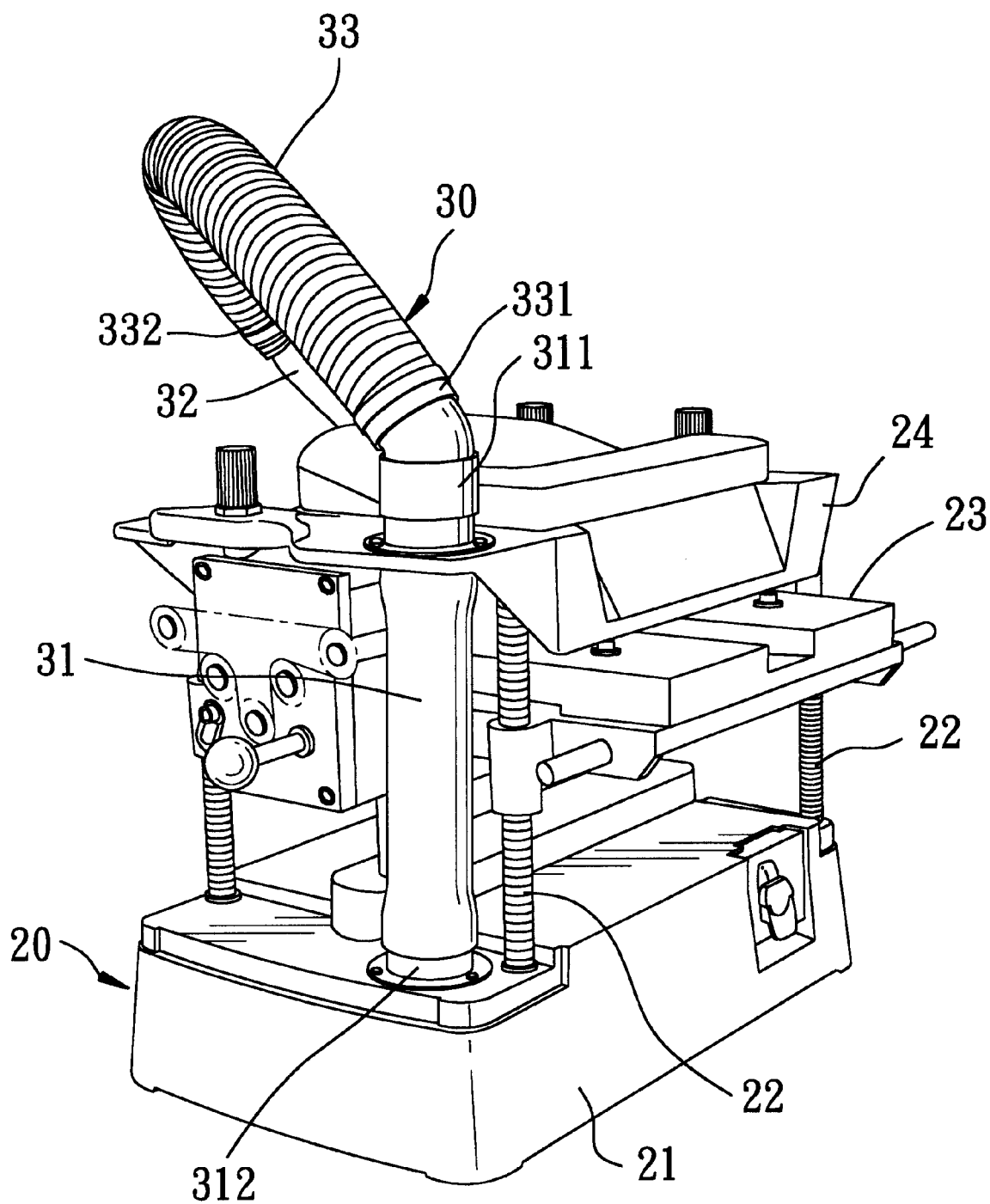
FIG. 1 is a perspective view of a preferred embodiment of a wood planing machine according to this invention.
Figure 2:
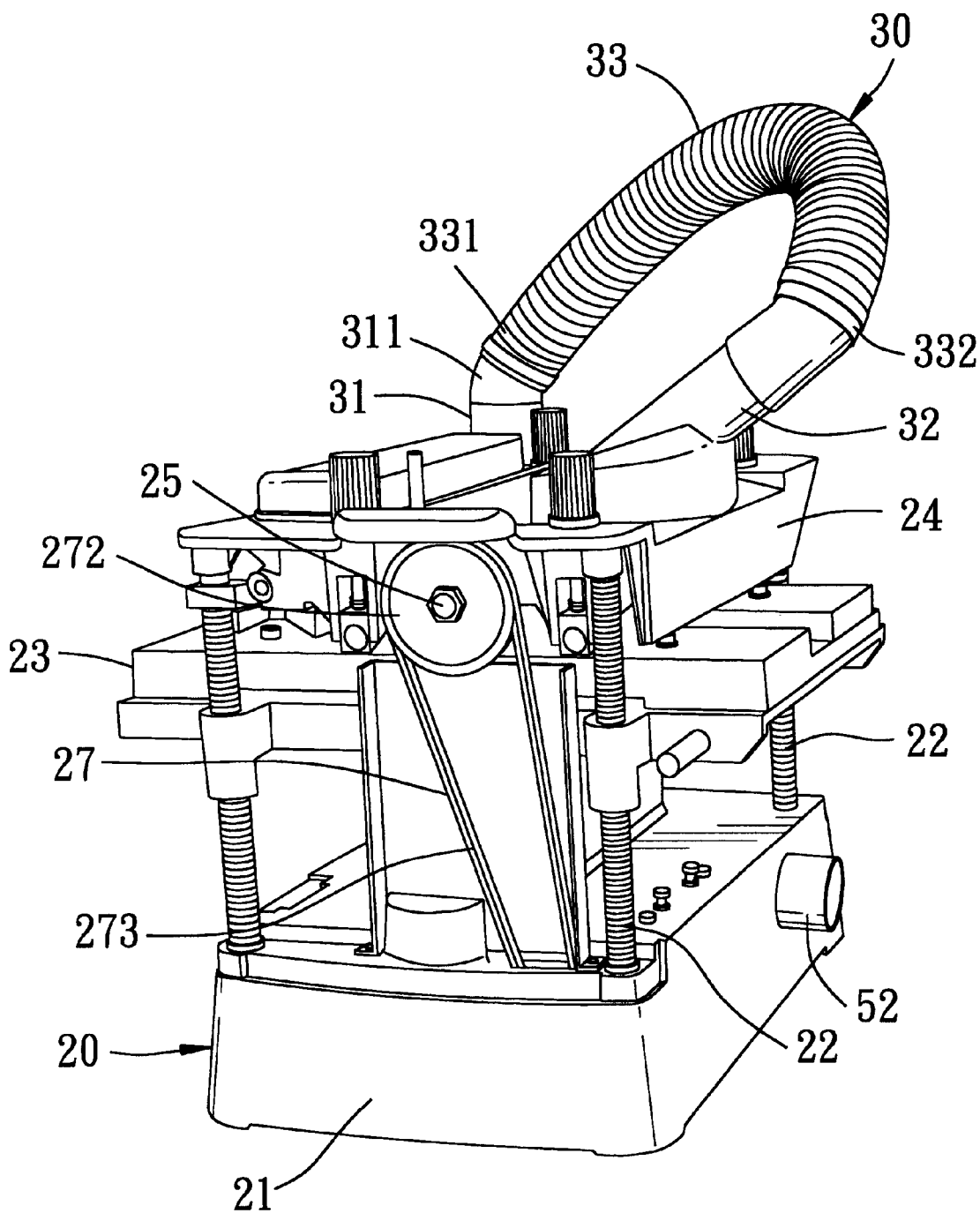
FIG. 2 is a perspective view of the preferred embodiment viewed from another side.
Figure 3:
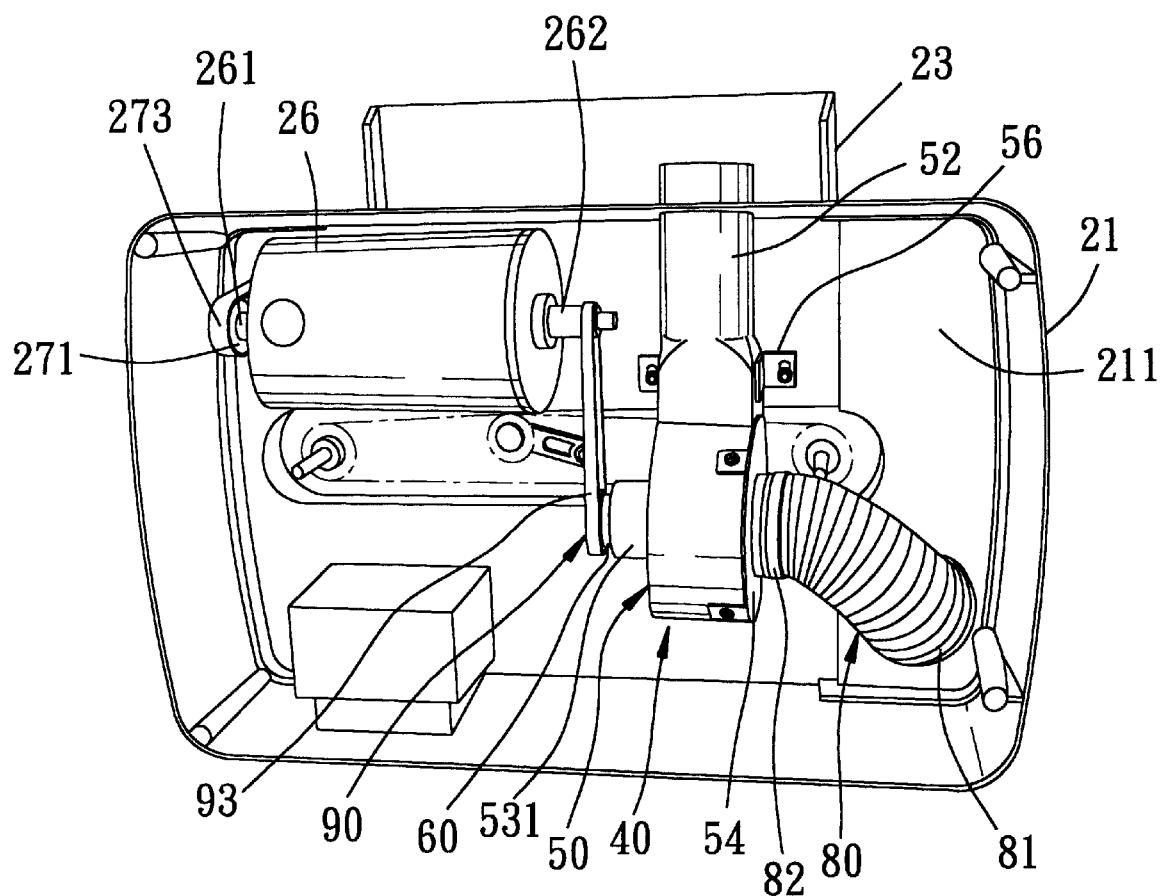
FIG. 3 is a bottom view of the preferred embodiment.

Referring to FIGS. 1 to 3, the preferred embodiment of the wood planing machine according to the present invention is shown to comprise a machine frame 20, a motor 26, a cutting member 25, a first transmission member 27, a wood shaving collecting member 30, and a blowing mechanism 40.

The machine frame 20 includes a base seat 21, and right and left mounting sides 22 which are spaced apart from each other in a longitudinal direction. Each of the right and left mounting sides 22 includes front and rear guiding rods which are spaced apart from each other in a transverse direction relative to the longitudinal direction, and has upper and lower ends opposite to each other in an upright direction transverse to the longitudinal and transverse directions. An upper seat 24 is secured on the upper ends of the mounting sides 22. A support carriage 23 is sleeved on the mounting sides 22 between the base and upper seats 21,24, and is movable in the upright direction to cooperate with the upper seat 24 to confine a path therebetween which extends in the transverse direction for passage of a wood workpiece.

The motor 26 is disposed on an underside 211 of the base seat 21, and has first and second output shafts 261,262 which define first and second axes and which extend in the longitudinal direction to deliver driving forces. The first and second output shafts 261,262 are disposed opposite to each other in the longitudinal direction.

The cutting member 25 has a rotating shaft which is rotatably mounted on the upper seat 24 and which extends in the longitudinal direction to define a third axis parallel to the first axis, and a cutting blade which is mounted on and which is rotated with the rotating shaft about the third axis.

The first transmission member 27 includes a first drive pulley 271 which is mounted to rotate with the first output shaft 261 of the motor 26, a first driven pulley 272 which is mounted to rotate with the rotating shaft of the cutting member 25, and a first belt 273 which is trained on the first drive and driven pulleys 271,272 to transmit the driving force of the first output shaft 261 to the rotating shaft in a known manner.

The shaving collecting member 30 includes a first rigid tubular portion 32 which is secured on the upper seat 24 and which confines an intake port in the vicinity of the cutting member 25, a second rigid tubular portion 31 which has an upper tube end 311 that is secured on the upper seat 24, and a lower tube end 312 that is disposed downwardly of the upper tube end 311 and that is secured on and that extends through the base seat 21 to confine an output port, and a flexible tubular portion 33 which has two ends 332,331 that are connected respectively to the first rigid tubular portion 32 and the upper tube end 311 so as to confine a duct therein.

Figure 4:
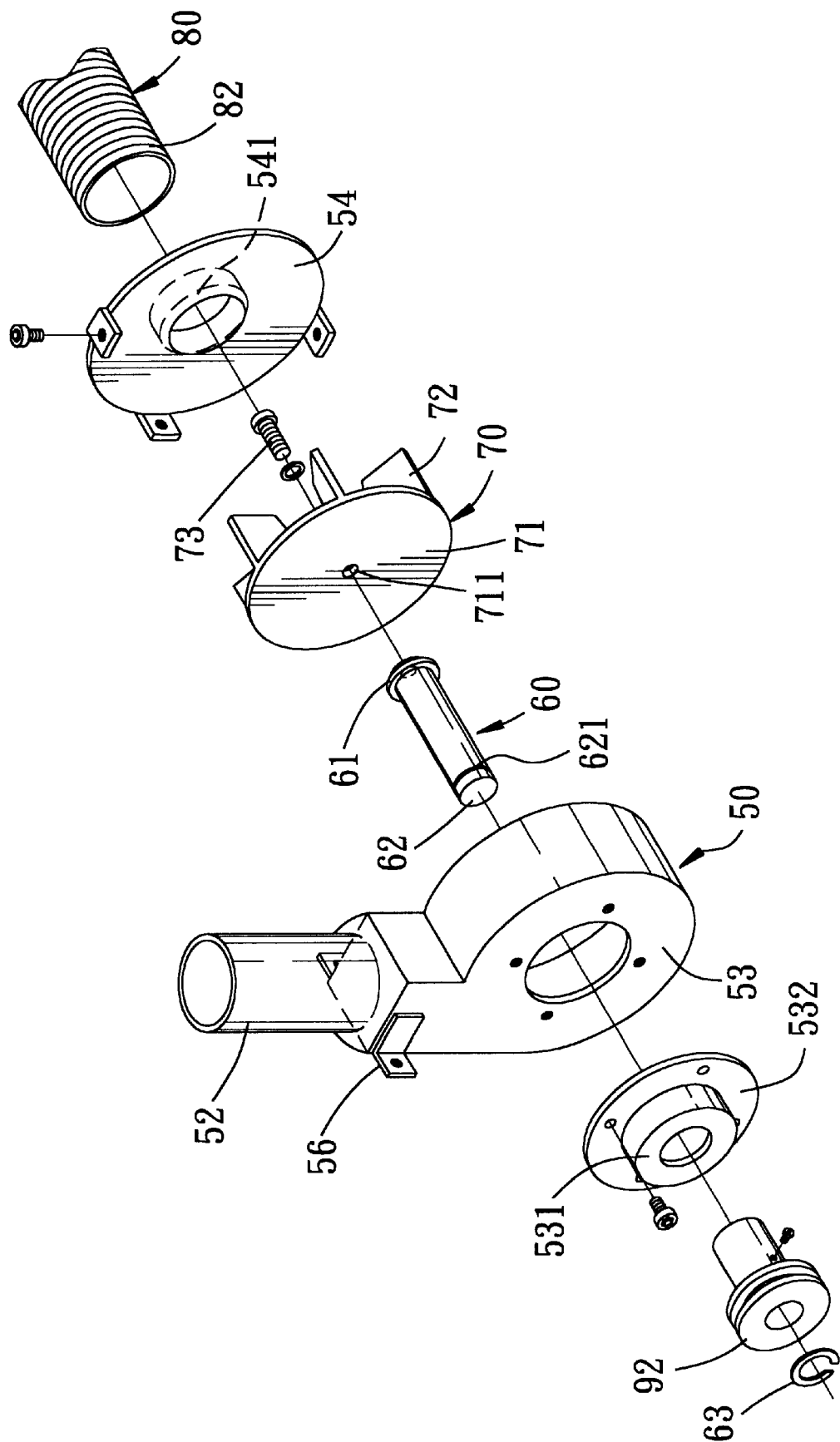
FIG. 4 is an exploded perspective view showing a blowing mechanism of the preferred embodiment.
Figure 5:
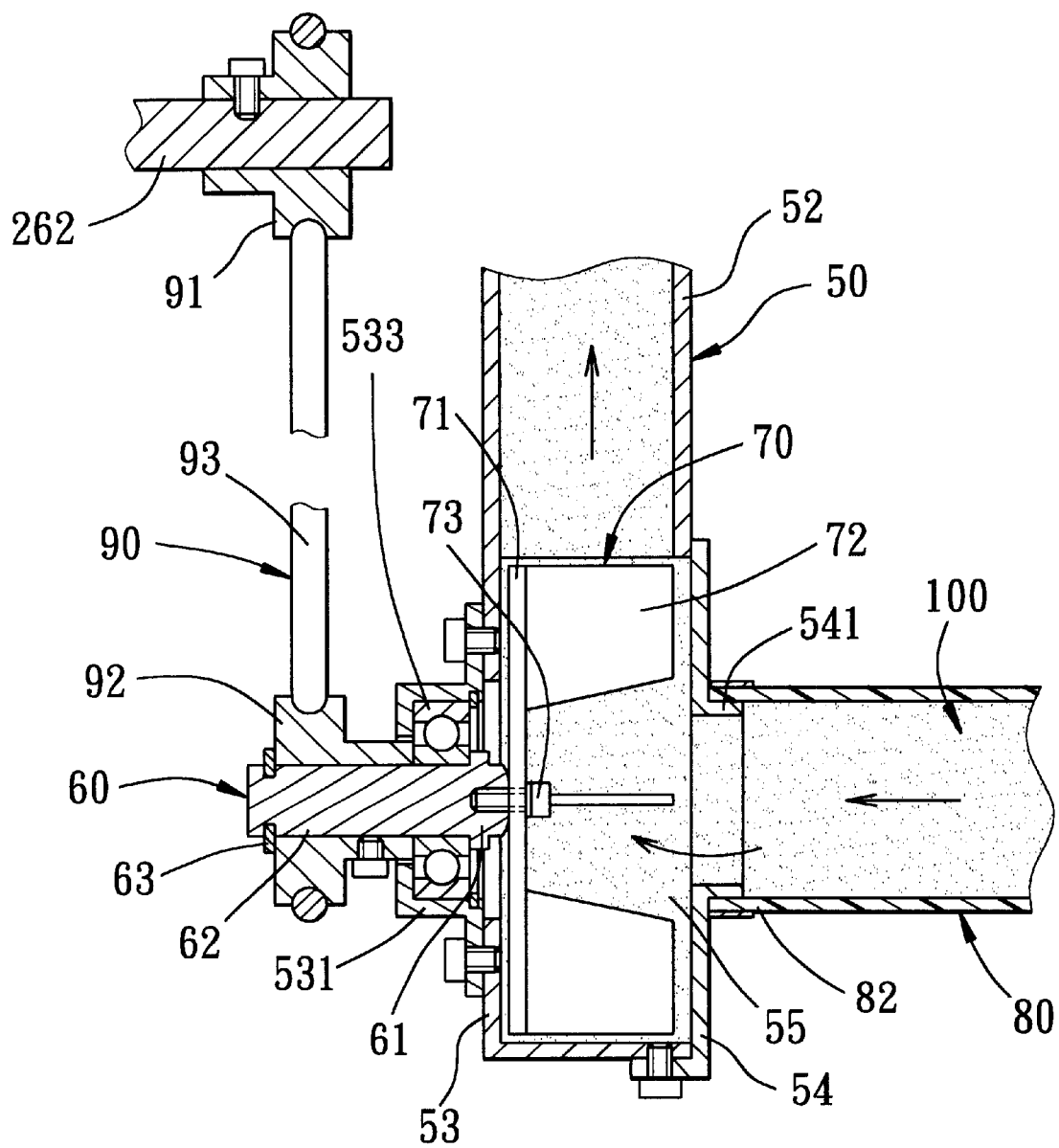
FIG. 5 is a fragmentary sectional view showing how the blowing mechanism is operated to draw the wood shavings.

With reference to FIGS. 3 to 5, the blowing mechanism 40 is disposed on the underside 211 of the base seat 21, and includes a flexible tubular member 80, a casing 50, a drive shaft 60, and an impeller 70. The flexible tubular member 80 has an end 81 which is connected to the lower tube end 312 of the second rigid tubular portion 31, and an opposite end 82.

The casing 50 is secured on the underside 211 of the base seat 21 by means of L-shaped plates 56, and has proximate and distal walls 54,53 which are spaced apart from each other in the longitudinal direction and which are respectively proximate and distal to the end 82 of the tubular member 80 to confine an accommodation chamber 55. The casing 50 further has a discharge port 52 which is disposed between the proximate and distal walls 54,53 and which extends in a direction radial to the longitudinal direction. The proximate wall 54 has an inlet port 541 which is formed therethrough in the longitudinal direction and which is communicated with the end 82 of the tubular member 80 so as to communicate the duct with the accommodation chamber 55. A cover plate 532 is secured on the distal wall 53, and has a bearing seat 531 for receiving a bearing 533 therein.

The drive shaft 60 is rotatably mounted on the distal wall 53 and the cover plate 532, and extends along a fourth axis parallel to the second axis of the second output shaft 262. The drive shaft 60 has a first end 61 which extends into the accommodation chamber 55, and a second end 62 which extends from the first end 61 and outwardly of the bearing seat 531. A second drive transmission member 90 includes a second drive pulley 91 which is mounted to rotate with the second output shaft 262, a second driven pulley 92 which is sleeved on and which is rotated with the second end 62 of the drive shaft 60 and which is retained on the drive shaft 60 by a snap ring 63 that engages an annular groove 621 in the second end 62, and a second belt 93 which is trained on the second drive and driven pulleys 91,92 to transmit the driving force of the second output shaft 262 to the drive shaft 60.

The impeller 70 is received in the accommodation chamber 55, and includes a connecting plate 71 which is secured on the first end 61 of the drive shaft 60 by a screw 73 that passes through a hole 711 and that engages threadedly the first end 61 so as to be driven by the first end 61 to rotate a plurality of fins 72 on the connecting plate 71 about the fourth axis. Thus, when the motor 26 is actuated during a wood planing operation, wood shavings 100 can be drawn from the shaving collecting member 30 into the accommodation chamber 55 and out of the discharge port 52. Preferably, a shaving bag (not shown) is disposed to be connected to the discharge port 52.

With the construction as such, the blowing mechanism 40 and the second transmission member 90 are shielded by the base seat 21, thereby resulting in noise and size reduction for the machine. Moreover, the drive shaft 60 of the blowing mechanism 40 is coupled to the second output shaft 262 of the motor 26 by the second transmission member 90, thereby resulting in steady transmission of the first and second transmission members 27,90.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A wood planing machine comprising:

a machine frame having right and left mounting sides spaced apart from each other in a longitudinal direction, each of said right and left mounting sides having upper and lower ends opposite to each other in an upright direction transverse to the longitudinal direction;

a motor disposed on said machine frame adjacent to said lower ends of said right and left mounting sides, and having first and second output shafts defining first and second axes and extending in the longitudinal direction to deliver driving forces, said first and second output shafts being disposed opposite to each other in the longitudinal direction;

a cutting member having a rotating shaft which is rotatably mounted on said right and left mounting sides and adjacent to said upper ends of said right and left mounting sides, and which extends in the longitudinal direction to define a third axis parallel to the first axis, and a cutting blade which is mounted on and which is rotated with said rotating shaft about the third axis;

a first transmission member disposed to transmit the driving force of said first output shaft to said rotating shaft;

a support carriage disposed on said right and left mounting sides and movable relative to said rotating shaft in the upright direction so as to cooperate with said rotating shaft to confine a path therebetween for passage of a workpiece;

a shaving collecting member disposed on said machine frame to collect wood shavings, and confining a duct which has an intake port that is disposed in the vicinity of said cutting member, and an outlet port disposed downstream of said intake port and adjacent to said lower ends of said right and left mounting sides;

a casing disposed under said support carriage, and having proximate and distal walls which are spaced apart from each other in the longitudinal direction and which are respectively proximate and distal to said outlet port to confine an accommodation chamber, said casing further having a discharge port which is disposed between said proximate and distal walls and which extends in a direction radial to the longitudinal direction, said proximate wall having an inlet port which is formed therethrough in the longitudinal direction and which is communicated with said outlet port so as to communicate said duct with said accommodation chamber;

a drive shaft rotatably mounted on said distal wall, extending along a fourth axis parallel to the second axis, and having a first end which extends into said accommodation chamber, and a second end which extends from said first end and outwardly of said distal wall;

a second drive transmission member disposed to transmit the driving force of said second output shaft to said second end of said drive shaft so as to rotate said drive shaft about the fourth axis when said motor is operated; and an impeller received in said accommodation chamber, and driven by said first end of said drive shaft to rotate about the fourth axis so as to draw wood shavings from said shaving collecting member into said accommodation chamber and out of said discharge port.

2. The wood planing machine of claim 1, wherein said shaving collecting member includes a first rigid tubular portion disposed in the vicinity of said cutting member to confine said intake port, a second rigid tubular portion including an upper tube end which is secured on said support carriage, and a lower tube end which is disposed downwardly of said upper tube end and which is secured on said lower ends of said mounting sides to confine said outlet port, and a flexible tubular portion having two ends which are connected respectively to said first rigid tubular portion and said upper tube end to communicate said intake port with said outlet port.

3. The wood planing machine of claim 1, wherein said first drive transmission member includes a first drive pulley mounted to rotate with said first output shaft, a first driven pulley mounted to rotate with said rotating shaft, and a first belt trained on said first drive and driven pulleys to transmit the driving force of said first output shaft to said rotating shaft.

4. The wood planing machine of claim 3, wherein said second drive transmission member includes a second drive pulley mounted to rotate with said second output shaft, a second driven pulley mounted to rotate with said drive shaft, and a second belt trained on said second drive and driven pulleys to transmit the driving force of said second output shaft to said drive shaft.

* * * * *